June 19, 1923. 1,458,957
R. H. SCHACHENMEIER
COURSE DRAFTER FOR MARINE AND AERONAUTIC VESSELS
Filed Aug. 20, 1919 2 Sheets-Sheet 1

Inventor
Richard H. Schachenmeier
By his Attorneys
Pennie, Davis, Marvin & Edmonds June 19, 1923.
R. H. SCHACHENMEIER
1,458,957
COURSE DRAFTER FOR MARINE AND AERONAUTIC VESSELS
Filed Aug. 20, 1919     2 Sheets-Sheet 2
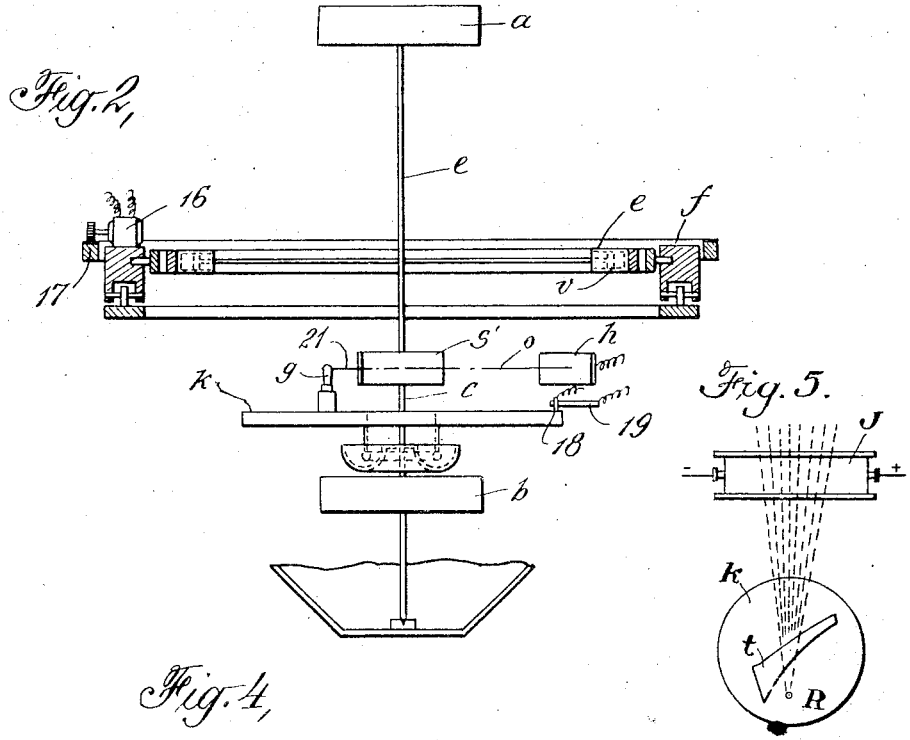
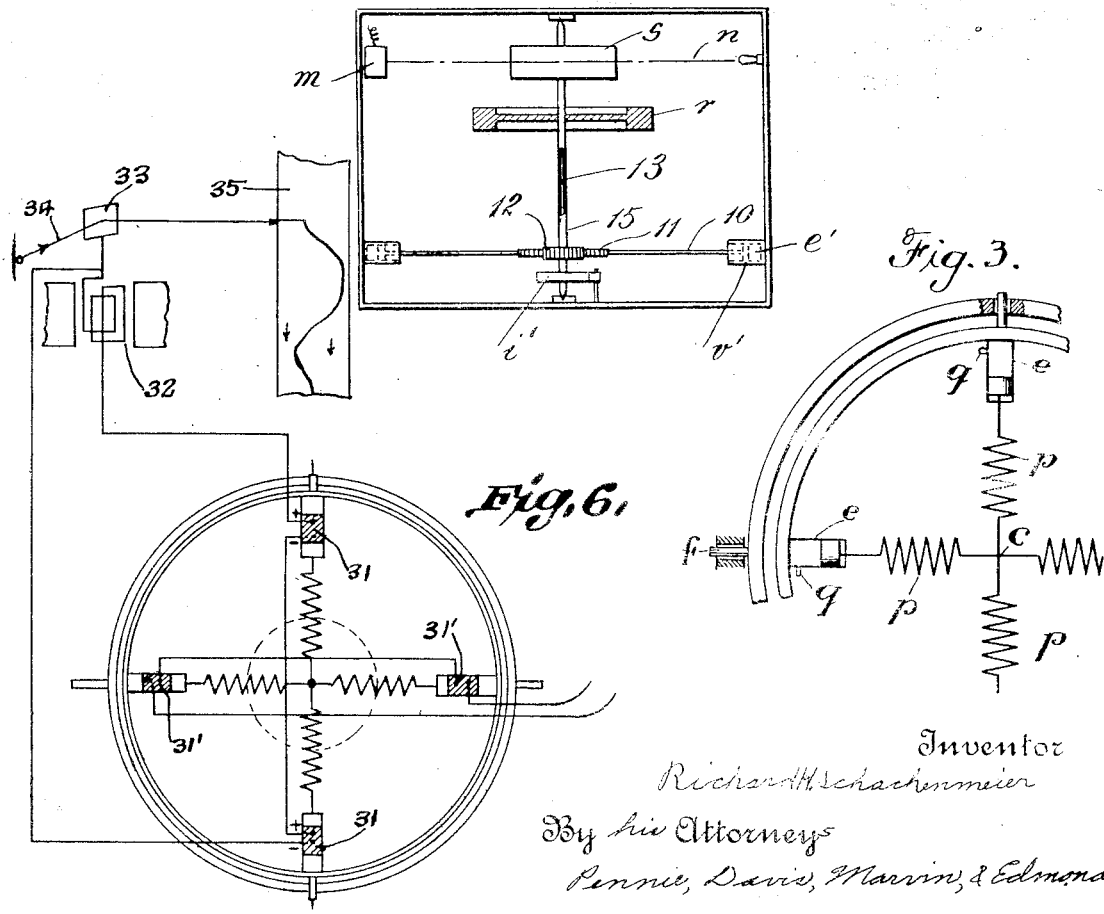
Inventor
Richard H. Schachenmeier
By his Attorneys
Pennie, Davis, Marvin, & Edmonds Patented June 19, 1923.

1,458,957

UNITED STATES PATENT OFFICE.

RICHARD HERMANN SCHACHENMEIER, OF KARLSRUHE, GERMANY.

COURSE DRAFTER FOR MARINE AND AERONAUTIC VESSELS.

Application filed August 20, 1919. Serial No. 318,804.

(GRANTED UNDER THE PROVISIONS OF THE ACT OF MARCH 3, 1921, 41 STAT. L., 1313.)

*To all whom it may concern:*

Be it known that I, RICHARD HERMANN SCHACHENMEIER, a citizen of Germany, residing at and whose post-office address is Karlsruhe, Haydnplatz 3, Germany, have invented certain new and useful Improvements in Course Drafters for Marine and Aeronautic Vessels (for which I have filed an application in Germany, December 21, 1915, Patent No. 349,554, and Germany, June 11, 1918); and I do hereby declare the following to be a full, clear, and exact description of the invention, such as will enable others skilled in the art to which it appertains, to make and use the same.

Devices are known which draw or record the course traversed by a vehicle or vessel by integrating the equations of motion. But in the devices hitherto proposed for this purpose a very copious use of appliances similar to relays and of screws, toothed racks and the like, is made which involve so much inertia and friction in the whole apparatus that anything like an exact working of the same is out of the question. Besides, in the known devices a gyroscopic compass or the principle of a simple pendulum is employed for maintaining the vertical position of the apparatus. But if a gyroscope is employed only a few hours will elapse before the maintenance of the vertical position becomes a very difficult matter whilst a simple pendulum is deflected from the vertical position by centrifugal forces.

The object of the present invention is to overcome these drawbacks. This is accomplished by a device wherein, in order to avoid transmission by intermediate elements and intermediate gear, physical properties of matter are employed in which inertia and friction do not come into account and wherein the maintaining of the vertical position is accomplished by means of a pendulum which is set upside down upon a point and the weight or mass of which is supported by a gimbal holder in such manner that when changes of direction and speed occur the forces of inertia of the pendulum are taken up by the points of support whilst maintaining its vertical position. The device thus performs two tasks simultaneously, viz, the bringing about and maintaining of the vertical position, and the providing of the forces of inertia to be measured; and in accomplishing this it avoids the above-mentioned drawbacks of known devices, besides excluding all disturbing vibrations and lurching motions occurring during the working of the ship in rough seas etc. with the aid of a swinging system of adequate dimensions which also permits of the exactitude of the measurements being carried to any desired degree.

The operation of the devices will be more clearly described with reference to the accompanying drawing in which the instrument is diagrammatically illustrated.

Fig. 2 is a sectional elevation taken on line 2—2 of Fig. 1;

Fig. 3 is a detail view of a modification;

Fig. 4 is a sectional view taken on line 4—4 of Fig. 1;

Fig. 5 is a detail view of a modification, and Fig. 6 is a view illustrating a modified form of recording apparatus.

Figure 1:
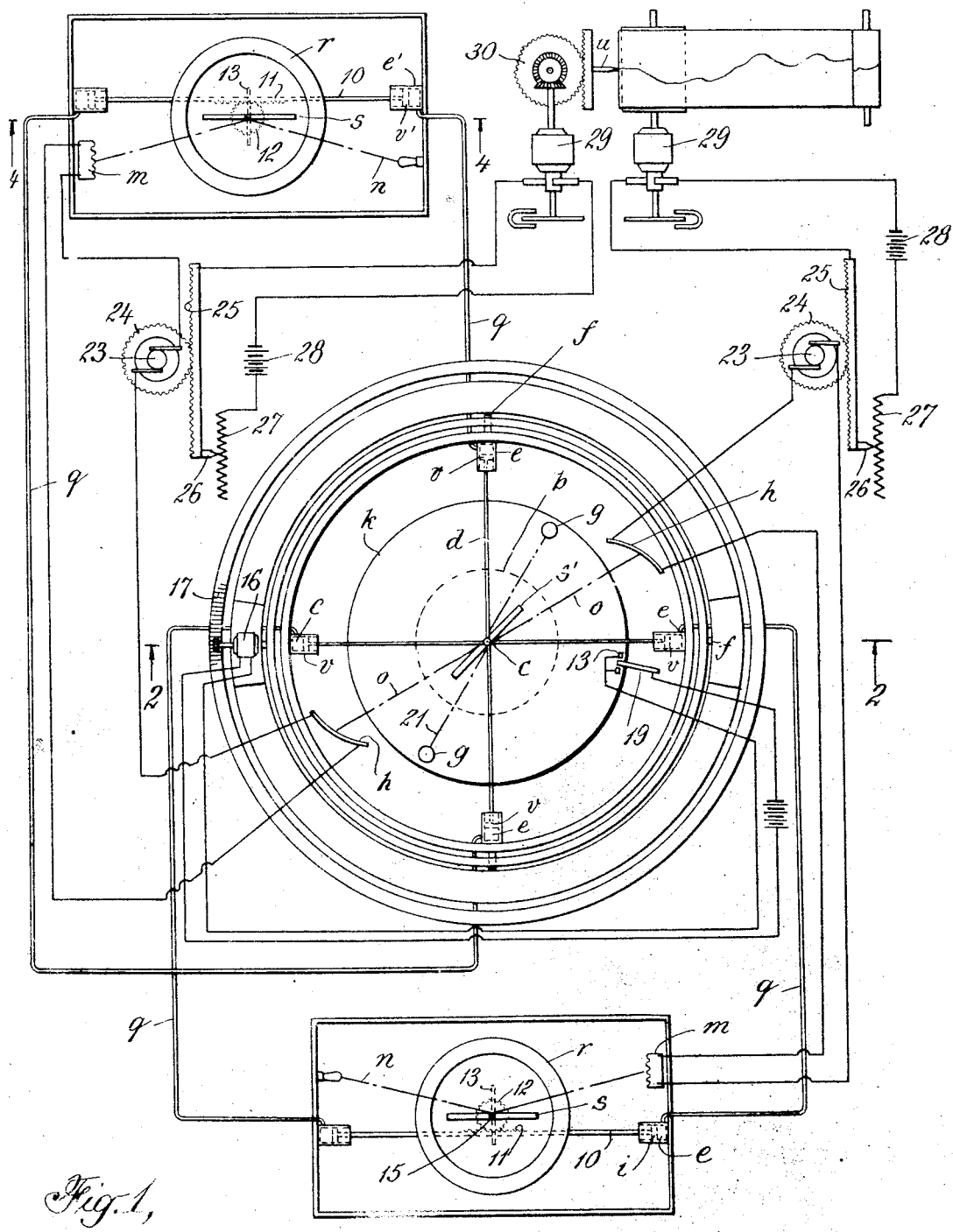
Fig. 1 is a plan view, largely diagrammatic, of my improved course drafting apparatus.

If $x, y$ are co-ordinates extending at right angles to each other on a plane in which the motion takes place and, for example, coinciding with the north-south and east-west directions, and if $X, Y$ represent the components of active force corresponding to the said coordinates, the curve of travel is determined, if the initial position and speed are known, by the equations of motion:

1. $M\dfrac{d^2x}{dt^2}=X, \quad M\dfrac{d^2y}{dt^2}=Y$ wherein $t$ denotes time and $M$ the mass of the moved body. The course-drafter must therefore perform the following functions:

(A) take up the forces $X, Y$ which act upon a mass $M$ during the course of the motion, and (B) integrate the equations (1).

The present invention relates primarily to a device for carrying out the function (A) which constantly indicates the vertical direction and hence the horizontal plane of the motion. This device consists of a pendulum $a, b, c$ (Fig. 2, the pendulum bodies $a, b$ having a total mass M) stood on a point and combined with a gimbal $f$ in such manner that the force of gravity acting on the mass of the pendulum $a, b$ suppresses displacements of the gimbal from the vertical position in consequence of its comparatively large size and of the large levers that come into play, whilst the forces of inertia X, Y of the mass $a, b$ are taken up by springs or, by cylinders $e, e$ containing liquid so as to avoid fluctuations of the gimbal. To this end the plane of the four piston rods $d, d$, which, for the purpose of avoiding a rigid connection, may be replaced by springs $p, p$, as shewn in Fig. 3, coincides with the plane of the two gimbal pivots $f, f$ in the position of rest, and the center of gravity of the masses $a, b$ of the pendulum lies within or slightly below the said plane. The pressures X, Y of the liquids are transferred to points of utilization by any convenient means, here shown as hydraulic conduits $q$ communicating with the cylinders $e$ and receiving pressure therefrom.

In Fig. 4 an instrument is shewn which measures the forces taken up by the pistons $v, v$. In this instance the swinging system consists by way of example of a horizontal annular disk $r$ which is revoluble about a central vertical axis and which is kept in a position of equilibrium by a spring $i'$. The hydraulic pressure X is transmitted by means of the conduits $q, q$ from the cylinders $e, e$ to a second set of cylinders $e'$ which cooperate with the annular disk $r$. Within the cylinders $e'$ are provided pistons $v'$ rigidly interconnected by means of a rod 10 having a portion of its length toothed at 11 in the manner of a rack to mesh with a pinion 12 which is provided on the shaft 15 which supports the disk $r$. This mechanism serves to impart motion to the shaft 15.

Operation of the apparatus will be clear from the above description. When the course of the vehicle is changed the pendulum will tend to tip out of the vertical position and consequently the liquid in one or more of the cylinders $e$ is subjected to pressure, which pressure is transmitted through hydraulic conduits $q$ to the corresponding cylinders $e'$ and reacts against pistons $v'$. Since the rods connecting the pistons $v$ working in the cylinders $e$ are rigid, there will be a tendency toward diminution of pressure in the remaining cylinders $e$ and consequently in the corresponding cylinders $e'$. These unbalanced forces acting on pistons $v'$ give them a longitudinal motion and, through the rack 11 and pinions 12, turn the disk $r$ about its axis an amount proportional to the magnitude of the impulse conveyed to the piston $e'$, that is, proportional to the force in the direction of the $x$ coordinate which is developed at the pendulum due to the change in the course. A second pair of conduits $q$ and a second disk arrangement $r$ is provided to record the force impulses in the $y$ direction, the arrangement being identical with that just described.

The annular disk with its spring forms a mechanical system which is capable of executing its own free motions and whose period of oscillation depends on the power of the spring and on the moment of inertia of the disk. The latter may be increased to any desired extent without increasing the weight of the disk by selecting a suitable radius of the same. In this manner the period of oscillation is made of such length that it is large compared to the intervals within which disturbing impulses are imparted to the pendulum $a, b, c$ by the machinery, wind, lurching of the vessel in rough seas or the like. These impulses will then cause no appreciable deflection of the annular disk. The period of oscillation is also arranged to be short compared to the times in which changes of motion of the vessel (i. e., changes of speed or direction) take place. If any direction which approximately coincides with the main line of travel is taken as the axis of abscissas, the course may be taken to represent a periodic or non-periodic curve whose amplitudes are indicated with greater exactitude and with the lesser lag the smaller the natural periodic time of the annular disk is.

If, for example, it amounts to $\frac{1}{4}$ of the time in which the smallest sinusoidal arcs of the track are traversed, this will suffice to make the errors in the readings of the apparatus practically negligible.

A regulatable damping device, shown diagrammatically at 13 and which may be of any well known type adapted for use with a disk oscillating on a vertical axis, is provided on the supporting shaft 15 of the disk $r$ and is preferably adjusted to render the oscillations of the disk $r$ moderately damped in character. I have found that damping of such a nature as to permit the disk a complete oscillation to and fro subsequent to a single impulse is the most desirable in practice.

The spring $i'$ serves to limit the extent of rotation of the disk $r$ and is adjusted according to the mass of the pendulum. A pendulum of large mass has a correspondingly large inertia and will exert a large turning force on the disk $r$. The restraining spring $i'$ is consequently adjusted for a given pendulum to a tension commensurate with the turning movement which it will be called upon to restrain.

The communication of the angle $\alpha$ ascertained by the above-described device to an integrating device is accomplished by means of a flat mirror *s* which is attached to the annular disk *r* and whose plane coincides with the prolongation of the axis of rotation. A pencil of rays *n* emanating from a fixed source of light is reflected by the mirror to a set of soot-covered thermo-electric cells *m* which belong to the integration device. As the reflected rays turn through an angle which is twice as large as that of the mirror the accuracy of the readings will be thereby increased.

An additional device corrects the values determined by the thermal cells, making them appear as though the piston rods *d*, *d* always coincided with the principal points of the compass, as not being technically possible to actually keep the rods themselves in this position. To accomplish this the whole apparatus is roughly adjusted by mean of a relay electrically associated with a compass so as to coincide approximately with the principal points of the compass.

A more accurate correction is obtained by the means of a mirror *s'* mounted in parallelism with the axis of the pendulum and stationary relative to the piston rods *d*. On the outer edge of the compass disk *k* and stationary relative to this disk and to the rods *d* is a light source *g* adapted to direct a beam 21 upon the mirror *s'*, from whence it is reflected upon an electrical conductor *h* whose resistance varies with the intensity of light to which it is subjected, it being understood that the light source will be suitably shaded if desired so that the ray of light incident upon the conductor *h* will consist substantially of a single beam, as indicated in the drawings. Such resistance may be a sooted wire, a platinum strip, or any well known conductor of this type. The arrangement of the conductor *h* relative to the light source 20 and mirror *s'* is made such that its change of resistance is proportional to the cosine of the angle of deviation of the piston rods *d* from the principal points of the compass, and thus any current flowing through the conductor 22 is in effect multiplied by the cosine of this angle of deviation.

The small glowlamp may be substituted by a radium preparation *R*, Fig. 5, located at the same spot and whose rays impinge upon a so-called ionization-chamber *J* which takes the place of the metallic resistance. Instead of the mirror *s'* an absorbing screen *t* which is fixed to the pendulum and has a cross-section of suitable shape is placed in the path of the rays, so that they penetrate different thicknesses of the absorbing material (aluminium *e. g.*) according to the position of the compass card and thus give rise to changes of the ionization, which in turn alters the electric conductivity of the gaseous path in *J*.

The forces X, Y which are to be integrated may be utilized to produce electric currents whose intensities are proportional to the forces. This is accomplished by means of the thermo-electric cells *m* previously referred to in the description of the oscillating disk *r*. The light rays reflected from mirror *s* impinge on cells *m* which are so situated as to receive varying amounts of light as the angle of oscillation of disk *r* changes, and thus to generate an electro-motive force which varies in definite relation to the oscillation of the disk *r*. Since, as above described, the oscillation of disk *r* varies proportionally to the X or Y component of force, the electro-motive force of cells *m* will vary proportionally to the X or Y force. Thus an integration with respect to time of the current produced by cells *m* gives a result proportional to that which would be obtained by actually integrating the X and Y components of force with respect to time. The cells *m* and conductor *h* are connected in series, the variation in current due to the varying resistance of conductor *h* being in effect superimposed upon the current derived from cells *m* and effecting a correction for the deviation of piston rods *d* from the principal points of the compass. In Fig. 4 there is shown a single disk *r* and a single set of thermo-electric cells. These integrate, for example, the forces acting in the *x* direction, and it is to be understood that an identical system may be provided for the integration of the forces acting in the *y* direction.

The integration of the electric currents from these two systems of connections may be accomplished in various manners. For example, an integrating meter 23 may be placed in circuit with cells *m* and provided with a pinion 24 cooperating with a rack 25 which carries a contact 26 adapted to slide along a resistance 27 through which a current is flowing from the source 28, and thereby regulate the amount of resistance in the circuit. A second meter 29 is placed in circuit with the source 28. This meter will be actuated proportionally to the current flowing through resistance 27. For recording purposes the second meter is provided with a gear mechanism 30 bearing a stylus *u* which is rigidly attached to the gear and consequently has a motion proportional to the *x*-coordinate.

A second set of integrating devices is provided for the integration of the *y* component of current in a manner identical with that described for the *x* component. The integrating mechanism for the *y* component of current is, however, connected to a drum 32 carrying a chart upon which the stylus *u* is adapted to move. The movement of the drum is proportional to the *y* coordinate of displacement and that of the stylus to the *x* coordinate. Hence the curve traced on the chart bears a definite relation to the course of the vehicle and may be used as a chart for indicating the course.

All of the above-mentioned parts of the course-drafter are suspended, individually or several together, on springs so that fluctuations and knocks are eliminated both in the horizontal and the vertical direction. The strength of the springs and of the damping contrivances which might be required depends on the nature of the disturbing impulses which differ with the kind of the vessel or vehicle in question.

Other devices which are sensitive to light may be employed instead of those already mentioned, for example selenium cells, alkali cells or other devices affected by light.

A very simple apparatus will be obtained if it is only required to record the forces X, Y as functions of time and the curves thus produced are integrated graphically or by means of tables. This integration is easily carried out, because the curves are very simple, consisting mostly of straight pieces.

Instead of the cylinders $e, e$ containing a liquid, crystals of quartz, turmalin, or other material having similar electrical properties may be used. This embodiment of my invention is illustrated in Fig. 6, wherein quartz crystals 31 are spaced around the inner gimbal ring and are subjected to compressive forces when the course of the vehicle is changed due to the inertia of the pendulum, in the same manner as the hydraulic cylinders of Fig. 1 are subjected to pressure. According to the well known property of such crystals an electromotive force is generated under the influence of the physical forces acting on the crystals, and the magnitude of these electric potentials may be recorded by connecting the crystals in circuit with a sensitive galvanometer 32, as shown. The deflections of the galvanometer are recorded by means of a mirror 33 rotatable with the moving element of the galvanometer and upon which is incident a beam of light 34 from a suitable source. The beam 34 after reflection from the mirror is directed upon a sensitized photographic film 35 and serves to trace an impression on the film bearing a definite relation to the electromotive forces generated by the quartz crystals. It is, of course, understood that only a single pencil of rays 34 will be permitted to impinge on the mirror. A similar galvanometer is provided in circuit with the pair of crystals 31' which are displaced 90° about the periphery of the gimbal ring and serve to record the forces acting at right angles to those recorded by the crystals 31. In this manner a photographic record of the course pursued by the vehicle is recorded, the beam of light serving to trace a curve on the sensitized film similar to the curve traced by the stylus arrangement previously described.

The mass $a, b$ of the pendulum together with the spring $p, p$ represents an oscillating system that vibrates in a horizontal plane and whose natural period of vibration and damping are determined on the same principles as those of the annular disk. On these same principles the natural periodic times of the galvanometers and the damping effects required for the same are determined. The corrections required with regard to the chief points of the compass may be carried out precisely as explained above.

Instead of sending the currents to be integrated through galvanometers they may be sent directly through ampere-hour meters whose magnetic or mechanical inertia is such that suitable average values are integrated.

It is to be understood that the various details and arrangement of the parts of the apparatus may be varied within the full scope of the appended claims. It is further to be understood that the various details, such as the particular means of integrating the electric currents, the particular type of current sources and contact arrangements employed, the general arrangement of the circuits connecting the principal apparatus with the indicating devices, and the like, do not constitute an essential part of the invention and are not incorporated in the claims.

I claim:—

1. A course-drafter for recording the track traversed by a vessel by integration of the equations of motion comprising, a gimbal, a pendulum reversed so that its weight is at the top and its bar points downwards, whereby the weight of the pendulum opposes deflections of the vertical axis of the gimbal from its normal position, a carrying member attached to the gimbal and supporting the bottom point of the pendulum bar, and members between the weight of the pendulum and the gimbal for taking up the forces exerted due to the mass of the pendulum whilst maintaining its vertical position when the direction or speed of the vessel changes.

2. A course-drafter for recording the track traversed by a vessel by integration of the equations of motion comprising, a gimbal, a pendulum suspended in the said gimbal with its weight at the top and its bar pointing downwards, the weight of the pendulum opposing deflections of the vertical axis of the gimbal from its normal position, and members between the weight of the pendulum and the gimbal for taking up the forces exerted due to the mass of the pendulum whilst maintaining its vertical position when the direction or speed of the vessel changes.

3. A course-drafter for recording the track traversed by a vessel by integration of the equations of motion comprising, a gimbal, a pendulum suspended in the said gimbal with its weight at the top and its bar pointing downwards, the weight of the pendulum opposing deflections of the vertical axis of the gimbal from its normal position, members between the weight of the pendulum and the gimbal for taking up the forces exerted due to the mass of the pendulum whilst maintaining its vertical position when the direction or speed of the vessel changes, an oscillating recording member for recording the changes in the path traversed by the vessel, and means for transferring the said forces to the oscillating recording member.

4. A course-drafter for recording the track traversed by a vessel by integration of the equations of motion comprising, a gimbal, a pendulum suspended in the said gimbal with its weight at the top and its bar pointing downwards, the weight of the pendulum opposing deflections of the vertical axis of the gimbal from its normal position, members between the weight of the pendulum and the gimbal for taking up the forces exerted due to the mass of the pendulum whilst maintaining its vertical position when the direction or speed of the vessel changes, an oscillating recording member for recording the changes in the path traversed by the vessel, means for transferring the said forces to the oscillating recording member, and correcting means for making the readings of the device correspond to a system of co-ordinates in space such as the principal points of the compass, this correcting means comprising a radiating device sending out rays from a certain direction, a changeable resistance affected by the said rays and affecting the recording member, and a ray-affecting device fixed to the said pendulum.

5. A course-drafter for recording the track traversed by a vessel by integration of the equations of motion comprising, a gimbal, a pendulum suspended in the said gimbal with its weight at the top and its bar pointing downwards, the weight of the pendulum opposing deflections of the vertical axis of the gimbal from its normal position, members between the weight of the pendulum and the gimbal for taking up the forces exerted due to the mass of the pendulum whilst maintaining its vertical position when the direction or speed of the vessel changes, an oscillating member with a vertical axis, a radiating member sending out rays from a fixed point, a ray-affecting member fixed on the said vertical axis, means for transferring the forces to the said oscillating member, and an integrating device controlled by the rays sent out by the radiating member and affected by the ray-affecting member.

6. A course-drafter for recording the track traversed by a vessel by integration of the equations of motion comprising, a gimbal, a pendulum suspended in the said gimbal with its weight at the top and its bar pointing downwards, the weight of the pendulum opposing deflections of the vertical axis of the gimbal from its normal position, members between the weight of the pendulum and the gimbal for taking up the forces exerted due to the mass of the pendulum whilst maintaining its vertical position when the direction or speed of the vessel changes, an oscillating member with a vertical axis, a radiating member sending out rays from a fixed point, a ray-affecting member fixed on the said vertical axis, means for transferring the forces to the said oscillating member, a controlling device sensitive to the said rays sent out by the radiating member and affected by the ray-affecting member, and an integrating device controlled by the controlling device.

7. A course-drafter for recording the track traversed by a vessel by integration of the equations of motion comprising, a gimbal, a pendulum suspended in the said gimbal with its weight at the top and its bar pointing downwards, the weight of the pendulum opposing deflections of the vertical axis of the gimbal from its normal position, members between the weight of the pendulum and the gimbal for taking up the forces exerted due to the mass of the pendulum whilst maintaining its vertical position when the direction or speed of the vessel changes, an oscillating member with a vertical axis, a radiating member sending out rays from a fixed point, a ray-affecting member fixed on the said vertical axis, means for transferring the forces to the said oscillating member, a battery of thermoelectric cells sensitive to the said rays sent out by the radiating member and affected by the ray-affecting member, and an integrating device controlled by the battery of thermoelectric cells.

8. A course-drafter for recording the track traversed by a vessel by integration of the equations of motion comprising, a gimbal, a pendulum suspended in the said gimbal with its weight at the top and its bar pointing downwards, the weight of the pendulum opposing deflections of the vertical axis of the gimbal from its normal position, members between the weight of the pendulum and the gimbal for taking up the forces exerted due to the mass of the pendulum whilst maintaining its vertical position when the direction or speed of the vessel changes, an oscillating member with a vertical axis, a radiating member sending out rays from a fixed point, a ray-affecting member fixed on the said vertical axis, means for transferring the forces to the said oscillating member, a controlling device sensitive to the said rays sent out by the radiating member and affected by the ray-affecting member, the said controlling device transforming the varying forces into electric currents of proportional varying intensities, and an integrating device controlled by the controlling device.

In testimony whereof I affix my signature, in presence of two witnesses.

Dr. RICHARD HERMANN SCHACHENMEIER.

Witnesses:
M. KÜHN.
E. REHM.